(12) United States Patent
Claude

(10) Patent No.: US 7,698,091 B2
(45) Date of Patent: Apr. 13, 2010

(54) METHOD FOR DETECTING THE START OF A DIVE FOR A DIVE COMPUTER

(75) Inventor: Stéphane Claude, Grenchen (CH)

(73) Assignee: Eta Sa Manufacture Horlogere Suisse, Grenchen (CH)

( * ) Notice: Subject to any disclaimer, the term of this patent is extended or adjusted under 35 U.S.C. 154(b) by 1309 days.

(21) Appl. No.: 11/178,319

(22) Filed: Jul. 12, 2005

(65) Prior Publication Data

US 2006/0012484 A1 Jan. 19, 2006

(30) Foreign Application Priority Data

Jul. 13, 2004 (EP) .................................. 04103344

(51) Int. Cl.
*G01L 7/00* (2006.01)
(52) U.S. Cl. .......................... 702/139; 702/138; 368/11
(58) Field of Classification Search ................... 702/47, 702/75, 138, 183, 184, 189
See application file for complete search history.

(56) References Cited

U.S. PATENT DOCUMENTS

| | | | | |
|---|---|---|---|---|
| 3,992,948 A * | 11/1976 | D'Antonio et al. | .......... | 73/865.1 |
| 4,783,772 A * | 11/1988 | Umemoto et al. | ............ | 368/11 |
| 5,224,059 A * | 6/1993 | Nitta et al. | .................... | 73/384 |
| 5,570,688 A * | 11/1996 | Cochran et al. | ........ | 128/205.23 |
| 5,617,848 A * | 4/1997 | Cochran | ................ | 128/205.23 |
| 5,737,246 A * | 4/1998 | Furukawa et al. | ........... | 702/166 |
| 5,764,541 A * | 6/1998 | Hermann et al. | .............. | 702/98 |
| 6,678,629 B2 * | 1/2004 | Tsuji | .......................... | 702/139 |
| 7,448,384 B2 * | 11/2008 | Claude et al. | .......... | 128/204.22 |
| 2004/0042343 A1 * | 3/2004 | Germiquet et al. | ............ | 368/11 |
| 2006/0000286 A1 * | 1/2006 | Makela et al. | ................. | 73/700 |

FOREIGN PATENT DOCUMENTS

| EP | 682 301 A3 | 11/1995 |
|---|---|---|
| EP | 689 109 A1 | 12/1995 |
| EP | 1 396 766 A1 | 3/2004 |
| EP | 1 396 767 A1 | 3/2004 |

* cited by examiner

*Primary Examiner*—Hal D Wachsman
*Assistant Examiner*—Mi'schita' Henson
(74) *Attorney, Agent, or Firm*—Sughrue Mion, PLLC

(57) ABSTRACT

The present invention provides a method for detecting the start of a dive for a portable electronic device (1) comprising a pressure sensor (5) for measuring the value of the ambient pressure (P) as well as electronic circuits (2) for processing the pressure measurement results comprising a time base (4) and at least one memory zone (7, 8). The detection method updates the reference pressure value (Pref) on the basis of ambient pressure (P) measurements, this value being used to detect the start of a dive. In certain particular conditions, the method according to the present invention suspects the start of a dive, and backs up the value (Psauv) of the reference pressure (Pref) stored before updating. If the start of a dive is confirmed after having been suspected, the reference pressure value (Pref) stored is replaced by the backed up value (Psauv) upon activation of the dive mode.

9 Claims, 2 Drawing Sheets

US 7,698,091 B2

METHOD FOR DETECTING THE START OF A DIVE FOR A DIVE COMPUTER

FIELD OF THE INVENTION

The present invention concerns a method of detecting the start of a dive to be implemented in a portable electronic device of the dive computer type. More specifically, the method is to be implemented in a device of this type having at least one first operating mode and one second operating mode, called the dive mode. This device comprises a pressure variations sensor for measuring the value of the ambient pressure and electronic circuits for processing the results of the pressure measurements, comprising a time base and at least one memory zone.

The detection method according to the present invention is particularly based on a study of the ambient pressure as a function of time for detecting the start of a dive leading to a considerable increase in the ambient pressure value.

The present invention also concerns a portable electronic device especially adapted for implementing the aforementioned method.

BACKGROUND OF THE INVENTION

Methods for detecting the start of a dive using various physical principles are known from the prior art.

EP Patent No. 0 689 109 granted in the name of CITIZEN WATCH CO. LTD on 16 Dec. 1998, discloses a method of this type and a portable electronic device for implementing the same. In particular, this device is provided with specific means arranged for detecting an entry into contact of the device with water, and a pressure sensor, arranged for measuring the ambient pressure value. According to this patent, the pressure sensor is powered, in a first operating mode, so as to carry out an atmospheric pressure measurement approximately once an hour in order to store the value thereby obtained as the reference pressure value. Moreover, the specific water detection means, which can for example take the form of ohmic contacts arranged on the case of the device, are permanently or periodically powered.

The ohmic contacts thus fulfil a main switch function for the circuits dedicated to the operating mode relating to diving, particularly for the pressure sensor. In fact, when the presence of water is detected at the ohmic contacts, the powering frequency of the pressure sensor is modified such that the ambient pressure measurements are carried out with a period of the order of a second, in an operating mode called the preparation mode. These measurements allow the pressure variation value between the last measured value and the last stored reference pressure value to be calculated, the variation value then being compared to a predefined pressure value constituting a dive mode trigger threshold. When the pressure variation passes the trigger threshold, the dive mode is activated. In the opposite case, the sensor it still powered for several minutes in order to monitor the evolution of the ambient pressure. Once this time period has passed, the preparation mode is deactivated and the pressure sensor is again powered with a period of the order of an hour.

Such a detection method for example enables a distinction to be made between a situation in which the person wearing the device wets the latter by washing his hands and a situation actually corresponding to the start of a dive. In this latter case, the pressure measurements carried out by the pressure sensor enable the start of a dive to be validated after activation of the preparation mode, insofar as the device first experiences contact with water before its surrounding or ambient pressure increases.

However, this type of device has a significant drawback from the point of view of its construction, residing in the need to provide specific means for detecting the presence of water around its case. In the aforecited case of thus use of ohmic contacts, it is in fact imperative to provide specific means for guaranteeing the water resistance of the case of the device in the region of such contacts, which may involve significant consequences as regards the manufacturing cost of the device. Consequently, the method described hereinbefore has a similar drawback because it is based on the implementation of specific means for detecting the presence of water.

Other methods and devices are known from the prior art which do not implement such specific means for detecting the presence of water and which exploit ambient pressure measurements to detect the start of a dive.

In particular, such devices are known in which a pressure sensor is periodically powered to measure the ambient pressure value, the results of these measurements being stored. These devices are arranged such that every time there is a new ambient pressure measurement, the variation value between this last measurement and the preceding one is calculated and compared to a value defining a trigger threshold. Once the trigger threshold has been passed, the dive mode is activated, the penultimate measured pressure value being typically stored as the reference pressure, i.e. it is supposed to correspond to the surface pressure of the body of water in which the dive is being carried out.

This type of device has, however, a drawback because the precision of the detection of the start of a dive is entirely based on the value retained for the trigger threshold.

Thus, if the value retained for this threshold is too low, the device is exposed to a risk of the dive mode being inadvertently triggered. By way of example, if the person wearing such a device descends a mountain road at a sustained pace, the device is capable of mistaking the corresponding increase in pressure for entry into water. On the other hand, if the value retained for the threshold is too high, precision as to the trigger is liable to be poor if the wearer remains in the water in proximity to the surface for some time before the start of a dive. In such a case, it may also happen that the stored reference pressure value is not correct since it was measured in the water, at a lower depth than that corresponding to the trigger threshold. Such an error can, depending upon its amplitude, have dangerous consequences for the health of the person wearing the device, particularly from the point of view of data relating to any decompression stop onto which the error would be carried over.

SUMMARY OF THE INVENTION

It is a first object of the present invention to overcome the aforementioned drawbacks of the prior art by proposing a method of detecting the start of a dive with increased precision, the detection being carried out on the basis of measured ambient pressure values, and a portable electronic device adapted for implementing such a method.

Therefore, the invention provides a method of the type indicated hereinbefore, comprising the steps of:
  a) periodically measuring the ambient pressure value at a first frequency,
  b) storing the ambient pressure value as the reference pressure in the memory zone at a second frequency lower than the first frequency, c) periodically the value of the pressure variation between the measured ambient pressure and the reference pressure at the first frequency and, comparing the pressure variation value, called trigger threshold and stored in the memory zone d) activating the dive mode if the pressure variation value is higher than the trigger threshold or, in the opposite case, continuing to the next step, e) calculating, at a third frequency, the pressure variation value between the last two measured values of the ambient pressure and comparing the pressure variation value to a predefined magnitude, stored in the memory zone or determined on the basis of measured pressure values, the magnitude being lower than the trigger threshold, the third frequency being less than or equal to the first frequency, f) returning to step a) if the pressure variation value is less than the magnitude or, in the opposite case, implementing a dive start check loop comprising the operations of:
storing the reference pressure value as the backup reference pressure,
returning to steps a) to d) for a predetermined period of time during which the stored reference pressure value is replaced by the backup reference pressure value if the dive mode is activated in step d),
returning as normal to steps a) to f) once the predetermined period of time has elapsed.

Thus, according to this detection method, the reference pressure value is updated systematically, at a given frequency, this value being used as a reference for calculating the start of a dive.

Moreover, in some particular circumstances in terms of ambient pressure, the method according to the present invention provides a particular measurement for preventing dive start appreciation errors, as they may occur with the aforecited methods of the prior art. More specifically, the present invention provides a backup reference pressure value in case of any doubt as to the start of a dive. Thus, if the start of a dive is confirmed within a time interval of predefined length, the backup value is used as the reference value for the dive mode operation instead of any value updated in such time interval while, for example, the person wearing the device implementing the detection method was already perhaps in the water. Consequently, increased precision is obtained, with respect to the aforecited devices of the prior art, in particular for the value retained as the ambient pressure value at the surface of the body of water in which a dive is being carried out.

BRIEF DESCRIPTION OF THE DRAWINGS

Other features and advantages of the present invention will appear more clearly upon reading the following detailed description, made with reference to the annexed drawings, given by way of non-limiting example and in which.

DETAILED DESCRIPTION

Figure 1:
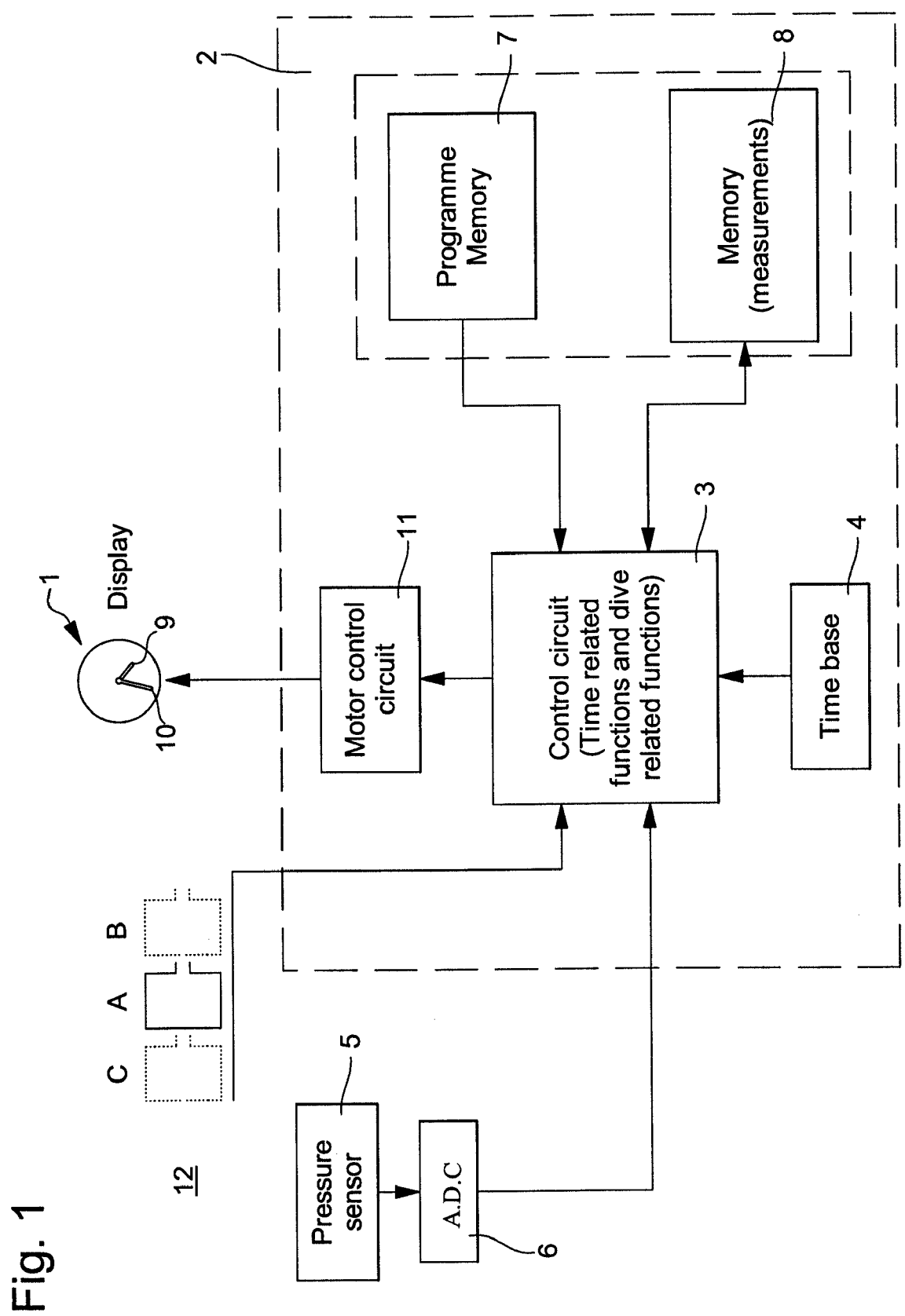
FIG. 1 is a schematic general diagram of the electronic circuit of an example portable electronic device for implementing the method according to the present invention.

FIG. 1 shows schematically a general diagram of the electronic circuit of an example portable electronic device for implementing the method according to the present invention. In the example used here, the portable electronic device takes the particular form of an electronic dive watch 1 with an analogue display comprising at least two operating modes, a first time mode and a second dive mode.

Of course, the method according to the present invention is not limited to implementation in a watch, but can also be implemented in any conventional type of portable dive computer without departing from the scope of the present invention.

Generally, the electronic circuit of watch 1 comprises in particular an integrated circuit 2 including a controller circuit 3 capable of controlling the conventional time functions of watch 1 comprising, for this purpose, a time division circuit and being connected in particular to a resonator 4 supplying a time base. From this time base, time related data is produced by controller circuit 3, particularly for carrying out the time mode functions and the functions relating to the dive mode.

Moreover, controller circuit 3 receives at input signals generated by a pressure sensor 5 generating analogue electrical signals representative of the ambient pressure. These signals pass through an analogue-digital converter 6 prior to being supplied to the input of controller circuit 3, in the form of a digital signal.

Pressure sensor 5 is of the conventional type and those skilled in the art will not encounter any particular difficulty in choosing one that is suited to implementation of the present invention.

Integrated circuit 2 also comprises memory zones, particularly a first memory zone 7, preferably of the non-volatile type, containing a programme allowing controller circuit 3 to carry out the calculations relating to the dive mode, on the basis of a decompression algorithm, for example. The selection of a reprogrammable non-volatile memory (Flash or EPROM, for example) enables the calculation programme to be altered subsequently as a function of the retained decompression algorithm. Integrated circuit 2 preferably comprises at least one second memory zone 8, also of the non-volatile type, in which measurements as well as results of the calculations carried out by controller circuit 3 are stored. This second memory zone 8 is provided in particular for storing the depth measurements and corresponding time-related measurements relating to the last dive or dives, by way of illustration.

From these respective input signals, controller circuit 3 determines the situation and state of the diver at each moment, from the diving point of view. For this purpose, in time mode, a pressure measurement can be carried out every second, for example. From all of these periodic measurements and on the basis of the programme stored in the first memory zone 7, controller circuit 3 determines a certain number of parameters pertinent to the diver's health, i.e. in particular, the residual nitrogen level dissolved in his organism and the quantity of micro-bubbles formed, for example.

Moreover, in the embodiment described, watch 1 has an analogue type display, comprising in particular hour hand 9 and minute hand 10, controlled by two-directional motors (not shown). Thus, controller circuit 3 is programmed to generate suitable signals to a control circuit 11 for the two-directional motors, such that hour hand 9 and minute hand 10 display data relating to the current time, in a first time mode, and data relating to diving in a second dive mode. The watch further comprises a control member 12, such as a stem-crown, provided in particular for setting the current time or for activating particular functions. By way of non-limiting example, FIG. 1 shows three positions marked A, B and C for control member 12, position A being a rest position, position B an unstable pushed-in position and position C a stable pulled position.

The reader interested in the operation of a portable electronic device of this type can consult, for example, EP Patent Application Nos. 1 396 766 A1 and 1 396 767 A1, both filed in the name of Asulab S. A on 4 Sep. 2002 and entitled "Montre électronique de plongée à affichage analogique", to obtain more details. In fact, since the method according to the present invention concerns passage from a first operating mode to the dive mode, the operation of the latter will not be dealt with in detail in the present Application.

Figure 2:
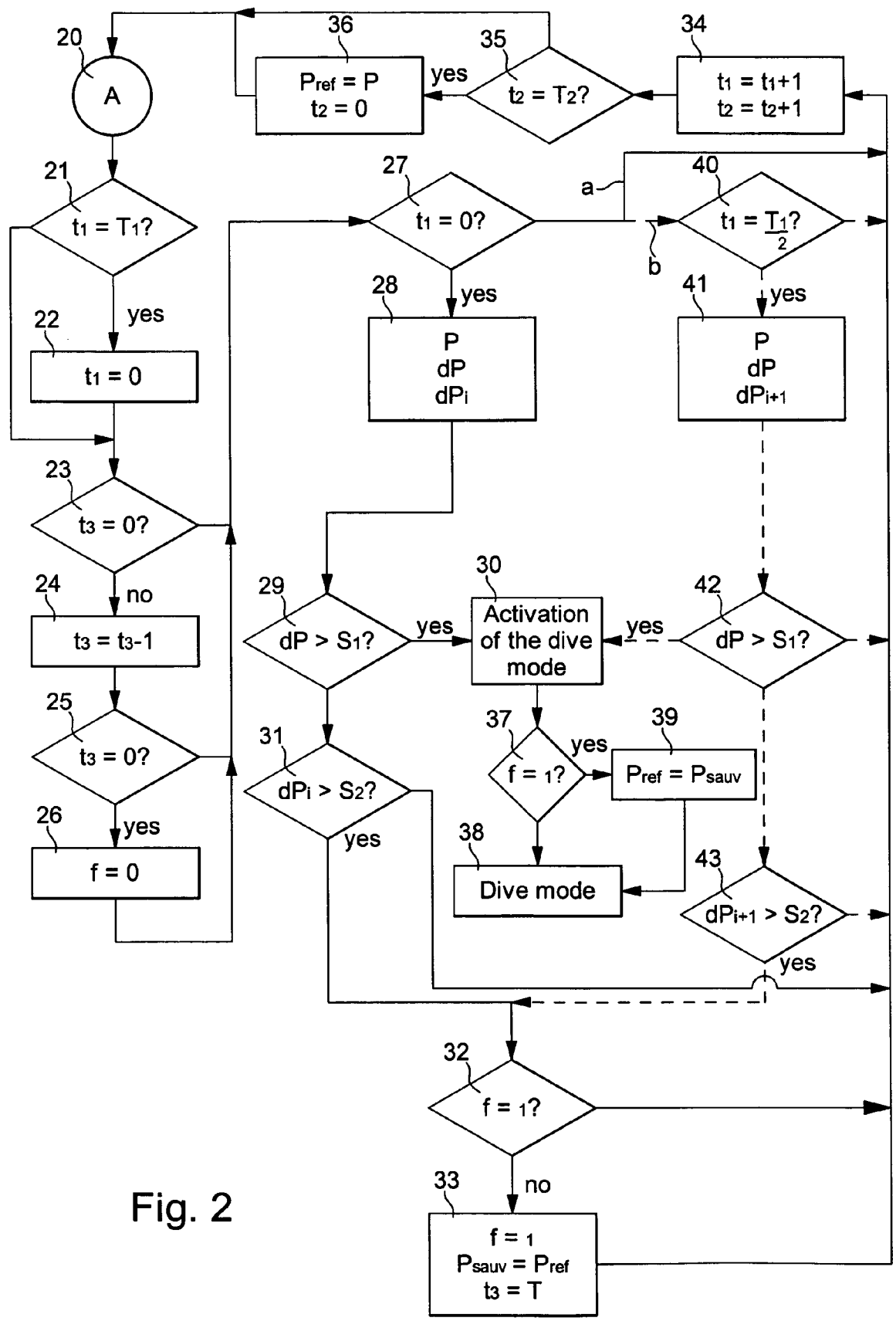
FIG. 2 is a diagram showing schematically the steps of the dive start detection method according to a preferred embodiment of the present invention.

FIG. 2 shows a diagram relating to a preferred embodiment of the dive start detection method according to the present invention, the description of this embodiment being provided by way of non-limiting example. This method allows the pressure measurements carried out periodically by pressure sensor 5 to be "filtered" to limit inadvertent triggering of the dive mode, as can happen with some devices of the prior art. More particularly, this method aims to prevent a device that implements it from failing to detect the start of a dive at the right moment, because for example the user stays in the water for a moment, at the surface, before actually starting the dive itself. In such a situation, implementation of a method according to the prior art would unhappily result in an erroneous reference pressure value being stored, since it was measured in the water.

Controller circuit 3 is programmed to power pressure sensor 5 periodically when the watch is in the time mode, to carry out ambient pressure value measurements.

The method starts at stage A, identified by reference numeral 20, of the diagram, a previously measured pressure value being stored as the reference pressure Pref. Moreover, a first counter (not shown) is provided for measuring first time intervals t1, this counter having a value of t1 comprised between 0 and T1 at stage A, T1 representing a measurement period value. Preferably, period T1 is substantially comprised between 0.1 and 10 seconds. The main function of the first counter is measuring the time intervals separating two successive test loops, as such, to evaluate whether the person wearing the device in which the method according to the present invention is being implemented is in a situation corresponding to the start of a dive.

At step 21 of the diagram, starting from stage A, controller circuit 3 tests the value of the first counter. While the value of the counter is not equal to T1, the method continues to step 23 of the diagram. When the value of the first counter reaches the value T1, the latter is reset to zero, at 22 in FIG. 2, before returning to step 23.

Step 23 forms a new test operation carried out on the value of a third counter t3 to check whether the value of t3 is zero or not. The default value of t3 is zero, the cases in which this value is not zero will be explained in the following description.

When the value of t3 is zero, the method continues directly to step 27, where the value t1 of the first counter is again tested. When the value of t1 is different to zero, the method continues on the path marked in FIG. 2, to go to the step referenced 34.

Step 34 constitutes a counting step during which the value t1 of a first counter is incremented. It can also be seen, in FIG. 2, that the value of a second counter t2 is also incremented at step 34, the main function of this second counter being measuring the time intervals separating two successive updates, in memory zone 8, of the value stored as the reference pressure value Pref. Preferably, the value Pref is updated periodically by a period T2, T2 having a value substantially comprised between 20 seconds and 10 minutes. In other words, the updating frequency f2 for reference pressure value Pref is substantially comprised between 0.001 and 0.05 Hz.

The cycle that has just been described, which constitutes a simple counting loop, ends at start point A, at 20, after any updating of the stored value of reference pressure Pref. In fact, the method provides for value t2 of the second counter to be tested at 35. If t2 is different from T2, i.e. one complete period has not elapsed, the method restarts directly at A without updating the reference pressure value. If, conversely, t2 is equal to T2, one complete period has elapsed and the reference pressure value Pref is updated at 36, while the value t2 of the second counter is reinitialised before returning to A.

The cycle, as described hereinbefore, is repeated until the first counter takes the value T1 at 34, this value then being detected at 21 in the following cycle, causing the first counter to be reset to zero.

Thus, the test of step 27 on the value of the first counter returns the response "yes", in other words, the zero value of the first counter causes the method to continue to step 28 of FIG. 2.

Pressure sensor 5 is then powered to carry out an ambient pressure measurement P, at 28. On the basis of the measurement carried out, controller circuit 3 calculates a pressure variation dP, on the basis of the last measured pressure values and the previously stored reference pressure Pref. Furthermore, the controller circuit also calculates a pressure variation dPi on the basis of the last two ambient pressure measurements carried out, the last measured value being systematically stored in memory zone 8.

Controller circuit 3 then compares, at 29, the value calculated for pressure variation dP to a first predefined value S1, called the trigger threshold and which corresponds to a height of water that preferably has a value of between 0.2 and 1.5 meters.

When pressure variation value dP exceeds trigger threshold S1, the dive mode is activated, at 30.

In the opposite case, namely when pressure variation value dP is less than trigger threshold value S1, controller circuit 3 carries out an additional test on pressure variation value dP1, at 31. More specifically, the controller circuit compares the value of dPi to a second predefined value S2, less than trigger threshold S1, this operation preferably being carried out at the same frequency as the ambient pressure measurements, at 28. However, as an alternative, the test frequency 31 could be different to that of the ambient pressure measurements without departing from the scope of the present invention. The second predefined magnitude S2 preferably corresponds to a depth comprised between the resolution of the sensor, namely 0.05 meters depending upon the type of sensor arranged in the device, and 0.5 meters.

When the value of dPi is less than S2, the method ends directly with the incrementing step, at 34, and possibly with the step of updating stored reference pressure value Pref, at 36, as was described hereinbefore.

In the opposite case, namely when the value of dPi is higher than or equal to second predefined value S2, the method continues with an additional test designated by the reference numeral 32 in FIG. 2.

This test 32 consists in evaluating the value of a state indicator designated f, the value of state indicator f being a function of the situation of the device in which the method according to the present invention is being implemented. More specifically, indicator f can take two values, 1 or 0, depending upon whether or not the method has detected the portable start of a dive, without detection threshold S1 having been crossed during the test of step 29. A probable dive start is detected at step 31, when the pressure variation value between two successive measurements exceeds the value of second predefined magnitude S2. In this case, a dive start check loop is activated for a predetermined period of time, indicator f taking the value 1 when the check loop is operating. When the method does not detect a probable start of a dive and the check loop is not operating, the value of indicator f remains zero.

Thus, the test step at 32 evaluates whether a check loop is operating. If this is the case, i.e. if the value of indicator f is 1, the method continues to incrementing step 34.

When the value of state indicator f is zero during test 32, this means that a probable dive start has been detected whereas the check loop is not operating. The method then continues to step 33 during which the value of state indicator f is altered from 0 to 1 to take account of activation of the check loop.

However, the stored reference pressure value Pref is backed up in memory zone 8, as the backup reference pressure value Psauv. As already mentioned, such a backup measurement allows the value of the reference pressure value stored at step 36 to be periodically updated when a dive start is suspected. At the same time, the value of third counter f3 is altered from 0 to T, T corresponding to a predetermined period of time during which the check loop is kept operational. Preferably, T would be chosen to be a value of the order of 2 to 10 minutes, which corresponds to a reasonable value to take account of a situation of the type of that mentioned previously, namely when the diver remains in the water, in proximity to the surface, for an instant before actually starting the dive.

The method then continues by implementing the aforementioned incrementing step 34.

Once the check loop is activated, there are certain alterations to the operation of the cycle as previously described in order to take account of the suspicion of a dive start.

In particular, the test of step 23 on the value of third counter t3 indicates that this value is not zero insofar as it has been altered to T at step 33. At this stage, the value of the third counter is then decremented, at 24 before being tested again at 25 to check whether its new value is zero.

A zero value of third counter t3 indicates that the predetermined period of time T has elapsed and that the dive start check loop can end. In this case, the value of state indicator f is reset to zero at step 26 to indicate to the device in which the method is being implemented that the dive start check loop is not active, this information being pertinent in relation to the test of step 32. After resetting the value of state indicator f to zero, the method continues normally to step 27, in the manner previously described.

A value of third counter t3 different to zero indicates that the previously activated dive start check loop is not yet finished. The check loop continues then to step 27, as mentioned hereinbefore, i.e. without implementing step 33 if the value of the difference between the last two measured pressure values dPi is higher than the value of the second predefined magnitude S2 during the test referenced 31.

If the trigger threshold is passed during the step 29 test, while the check loop is activated, the dive start suspicion is confirmed. Generally, an additional test of the value of state indicator f, provided at step 37, is implemented to detect the value of indicator f and to confirm, in the present case, that the check loop is actually activated.

If it appears from test 37 that the value of indicator f is zero, which corresponds to a situation where a dive start has not been suspected, the dive mode, as such, is directly activated at 38.

If, however, activation of the check loop is confirmed by a value of indicator f equal to 1 in step 37, the value of stored reference pressure Pref is replaced by the reference pressure value backed up at step 33, Psauv, in the step referenced by 39 in FIG. 2 before implementing the dive mode, as such, at 38.

In fact, the stored value of reference pressure Pref is used not only in detecting the start of a dive by calculating a variation in the ambient pressure, but also in the operation of the dive mode as such, particularly to carry out the depth calculation at a given moment during the dive. Thus, it should be noted that it is important to have a high level of precision as to the stored reference pressure value, on the one hand, to guarantee reliable operation of the device in which the method is being implemented, and on the other hand, for security reasons relating to the health of the person wearing the device. Since the method according to the present invention can be implemented in devices of various complexities, it is consequently possible to envisage making at least one of these devices capable of providing its user with indications relating to any decompression stops to be respected during the dive. Determination of these decompression stops and the respect thereof in terms of depth are subjected to the indications provided by the device. Consequently, if the stored reference pressure value Pref is not correct, the calculations of the gazes dissolved in the diver's organism and indication of the stops will not be correct, which represents a significant risk for the diver's health.

The backup method according to the present invention advantageously answers the aforementioned requirements.

FIG. 2 also shows additional steps implemented according to a variant of the embodiment that has just been described and which will be added to the counting loop.

In order to increase the dive start detection reliability, the behaviour of the ambient pressure can be evaluated several times at each period T1.

Thus, when it appears from the step 27 test that the value of the first counter t1 is different to zero, an additional test 40 can be carried out on the value by following the path designated b in FIG. 2. The step 40 test checks whether the value of first counter t1 has a value of T1/2. When this is the case, a series of additional tests is carried out at steps 41, 42 and 43, respectively similar to steps 28, 29 and 31.

In fact, when the value of first counter t1 has a value of T1/2, the ambient pressure P is measured, the pressure difference between P and Pref is calculated, as is the pressure variation dPi+1 between the last and penultimate measured ambient pressure values, these two values being separated by one complete period. Of course, in the calculation of dPi at step 28 and in accordance with the present variant, the calculation is also carried out between the last and penultimate measured pressure values, for the purpose of keeping an interval equal to one complete period between the corresponding instants of the two measurements.

The next two tests, at steps 42 and 43, are identical to the respective tests 29 and 31, the value of dP+1 being compared to the second predefined magnitude S2 in the test referenced 43, instead of dPi+1 at step 31.

Implementation of the present variant results in two identical series of tests being obtained, simply "interlaced" with each other to improve the dive start detection precision with respect to the simple version described hereinbefore.

It is clear that those skilled in the art would implement the above principle for a different number of series of tests without departing from the scope of the present invention. Of course, the longer the periods T1 and T2, the more it is possible to multiply the interlaced series of tests.

A general principle of the method according to the present invention consists in following the behaviour of the ambient pressure to detect any increases that could provide a hint as to a dive start. For this purpose, the use of a predefined magnitude S2 in steps 31 and 43 is not the only possible criterion. In fact, by way of alternative, the recent behaviour of the ambient pressure value with respect to its mean behaviour taken over a longer time interval could be evaluated. Thus, the detection method could be such that controller circuit 3 stores the last calculated pressure variation value dPi, as defined hereinbefore, in memory zone 8, this latter preferably comprising at least four locations for this purpose. Thus, the last calculated pressure variation value dPi is stored replacing the oldest dPi value still in the memory. The controller circuit then calculates the mean dPm value of the pressure variation on the basis of the last four values stored in the memory, designated dPi−3, dPi−2, dPi−1 and dPi, simply by adding them and dividing the result of the addition by four.

From the dPm value calculated hereinbefore, controller circuit 3 compares, at 31, this mean value to the last pressure calculated pressure variation value dPi.

When the last pressure variation value dPi is less than dPm, the method continues to the first and second counter incrementing step at 34.

When the last pressure variation value dPi is higher than dPm, the dive start check loop is activated if it was not already so. In this case, it is assumed in fact that the last calculated pressure variation is too high with respect to the variation taken into account over a longer period of time, this is why the method then provides a backup step for the stored reference pressure value Pref, at 33.

According to a preferred variant of the method which has just been described, the stored pressure variation values dPi−3, dPi−2, dPi−1 and dPi are replaced by zero in memory zone 8 during implementation of step 26, i.e. when controller circuit 3 determines that a sufficiently long time has elapsed since the start of the suspicion, this time being equal to T, without the dive start having actually been confirmed.

The general operating principle of the method according to the present embodiment is based on the fact that the ambient pressure increases considerably at the start of a dive. Thus, when the pressure value varies quickly from a value sufficient to pass the trigger threshold, the dive mode is activated. In the opposite case, two possibilities can be distinguished, namely the first case of ambient pressure stability, and the second case of a moderate increase in the ambient pressure.

In the first case, it is assumed that the user is not in the water. The stored reference pressure value Pref is then updated without any particular precautions, insofar as the stored value is representative of the real atmospheric pressure value with a high level of precision.

In the second case, a moderate increase in the ambient pressure can be attributed to two different causes, namely entry into water while remaining at a relatively low depth, or a quick surface descent, such as for example a quick descent down a mountain in a car or practice of an air sport. The method according to the present invention takes account of this type of event because the last reference pressure value is backed up to anticipate confirmation of a dive start.

Moreover, owing to this method, detection of the start of a dive can be guaranteed with a high level of reliability, inadvertent triggering of the dive mode being greatly limited.

The preceding description corresponds to preferred embodiments of the invention and should in now way be considered as limiting, as regards more specifically the structure described for the device implementing the method, the functions described, the nature and the number of control members used. As previously mentioned, the detection method according to the present invention can be implemented in any portable electronic device of the dive computer type, whether its display is analogue or digital. Likewise, the invention is not limited to the operating modes described, insofar as these parameters can be altered by suitable programming of the controller circuit. Those skilled in the art will not encounter any particular difficulty in adapting the method according to the present invention to their particular requirements, particularly as regards the values provided by way of example for the frequencies and correction magnitudes.

What is claimed is:

1. A method for detecting the start of a dive for a portable electronic device having at least one first operating mode and one second operating mode, called the dive mode, and including a pressure sensor for measuring a value of ambient pressure as well as electronic circuits for processing the results of said measurements including a time base and at least a memory zone, the method implemented in said first operating mode, including the steps of:
    a) periodically measuring an ambient pressure value at a first frequency,
    b) storing said ambient pressure value as a reference pressure in said memory zone at a second frequency lower than said first frequency,
    c) periodically calculating a first pressure variation value between the measured ambient pressure and the reference pressure at said first frequency and comparing said first pressure variation value to a predefined value, called the trigger threshold and stored in said memory zone,
    d) activating said dive mode if said first pressure variation value is higher than said trigger threshold or, in the opposite case, continuing to the next step e,
    e) calculating, at a third frequency, a second pressure variation value between the last two measured values of the ambient pressure and comparing said second pressure variation value to a predefined magnitude, or a mean pressure value determined on the basis of measured pressure values, stored in said memory zone, said magnitude or said mean pressure value being lower than said trigger threshold, said third frequency being less than or equal to said first frequency,
    f) returning to step a) if said second pressure variation value is less than or equal to said magnitude or, in the opposite case, implementing a dive start check loop comprising the operations of:
        storing said reference pressure value as a backup reference pressure value,
        returning to steps a) to d) for a predetermined period of time during which the stored reference pressure value is replaced by said backup reference pressure value if said dive mode is activated in step d), and
        returning as normal to steps a) to f) once said predetermined period of time has elapsed.

2. The detection method according to claim 1, wherein said first and third frequencies are equal.

3. The detection method according to claim 1, including the additional steps a'), c'), d'), e') and f') respectively identical to steps a), c), d), e) and f), implementation of said steps a'), c'), d'), e') and f') being inserted between two successive implementations of said steps a), c), d), e) and f).

4. The detection method according to claim 1, wherein said first frequency has a value comprised between 0.1 and 10 Hz.

5. The detection method according to claim 1, wherein said second frequency has a value comprised between 0.001 and 0.04 Hz.

6. The detection method according to claim 1, wherein the value of said trigger threshold corresponds to a height of water comprised between 0.2 and 1.5 meters.

7. The detection method according to claim 1, wherein the value of said predetermined period of time is comprised between 2 and 10 minutes.

8. The detection method according to claim 1, wherein, when said magnitude is determined on the basis of measured pressure values, step e) further includes an action of storing said pressure variation value at said first frequency, at least the last three stored pressure variation values being used to calculate said magnitude, the latter corresponding to the result of the calculation of the mean pressure variation over said at least three last values.

9. The detection method according to claim 8, wherein said magnitude is calculated on the basis of the last four stored pressure variation values.

* * * * *